(12) United States Patent
Leitner

(10) Patent No.: US 11,114,844 B2
(45) Date of Patent: Sep. 7, 2021

(54) INRUSH CURRENT LIMITER CIRCUITS AND METHODS OF LIMITING INRUSH CURRENT IN A CIRCUIT

(71) Applicant: VERTIV ENERGY SYSTEMS, INC., Lombard, IL (US)

(72) Inventor: John H. Leitner, Lorain, OH (US)

(73) Assignee: Vertiv Corporation, Columbus, OH (US)

(*) Notice: Subject to any disclaimer, the term of this patent is extended or adjusted under 35 U.S.C. 154(b) by 52 days.

(21) Appl. No.: 16/516,768

(22) Filed: Jul. 19, 2019

(65) Prior Publication Data

US 2020/0028353 A1 Jan. 23, 2020

Related U.S. Application Data

(60) Provisional application No. 62/701,071, filed on Jul. 20, 2018.

(51) Int. Cl.
| | |
|---|---|
| *H02M 3/156* | (2006.01) |
| *H02H 9/02* | (2006.01) |
| *H02M 3/06* | (2006.01) |
| *H02M 1/32* | (2007.01) |

(52) U.S. Cl.
CPC .......... *H02H 9/025* (2013.01); *H02M 1/32* (2013.01); *H02M 3/06* (2013.01); *H02M 3/156* (2013.01)

(58) Field of Classification Search
CPC ........ H02M 1/08; H02M 1/084; H02M 1/088; H02M 1/092; H02M 1/096; H02M 2001/4283; H02M 2001/4291; H02M 2003/1552; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

| | | | |
|---|---|---|---|
| 7,821,753 B2 | 10/2010 | Evans et al. | |
| 8,488,285 B2 | 7/2013 | Divan | |
| 8,922,133 B2 | 12/2014 | Hausman, Jr. et al. | |
| 2016/0226238 A1 | 8/2016 | Matsushita et al. | |
| 2017/0117722 A1* | 4/2017 | Shen | H02J 7/0021 |
| 2017/0271867 A1* | 9/2017 | Hamada | H02M 1/32 |
| 2017/0311396 A1 | 10/2017 | Sadwick | |
| 2018/0026623 A1 | 1/2018 | Cairoli et al. | |
| 2018/0213091 A1* | 7/2018 | Kostakis | G05F 1/468 |

* cited by examiner

*Primary Examiner* — Bryan R Perez
(74) *Attorney, Agent, or Firm* — Harness, Dickey & Pierce, P.L.C.

(57) ABSTRACT

A DC-DC power converter includes an input, an output, a power circuit coupled between the input and the output to convert a voltage of a DC power received at the input to a different voltage of a DC power supplied at the output, and a control circuit. The DC-DC power converter also includes a resistor coupled in an input current path to receive an inrush current from the input, a switch coupled in parallel with the resistor to selectively bypass the resistor, and a transistor coupled to control the switch in response to a voltage across the resistor. The transistor is coupled to open the switch when the voltage across the resistor is above a specified inrush threshold to permit current flow through the resistor, and to close the switch when the voltage across the resistor is below the specified inrush threshold to bypass the resistor.

20 Claims, 3 Drawing Sheets

INRUSH CURRENT LIMITER CIRCUITS AND METHODS OF LIMITING INRUSH CURRENT IN A CIRCUIT

CROSS-REFERENCE TO RELATED APPLICATION

This application claims the benefit and priority of U.S. Provisional Application No. 62/701,071 filed Jul. 20, 2018. The entire disclosure of the above application is incorporated herein by reference.

FIELD

The present disclosure relates to inrush current limiter circuits and methods of limiting inrush current in a circuit.

BACKGROUND

This section provides background information related to the present disclosure which is not necessarily prior art.

Electronic devices may experience large inrush currents when the devices are initially plugged into a power source, etc. The large inrush currents may damage electrical components in the devices that are sensitive to large inrush currents. For example, some electrical components in the devices may have maximum current ratings below the peak inrush current values. Some inrush current limiting circuits may protect sensitive electrical components by controlling a gate voltage of an inrush FET to keep the FET in linear mode during an inrush current phase.

SUMMARY

This section provides a general summary of the disclosure, and is not a comprehensive disclosure of its full scope or all of its features.

According to one aspect of the present disclosure, a DC-DC power converter includes an input for receiving DC power from a power source, an output for supplying DC power to an electronic device, a power circuit coupled between the input and the output to convert a voltage of the DC power received at the input to a different voltage of the DC power supplied at the output, and a control circuit coupled to control switching operation of the power circuit. The DC-DC power converter also includes a resistor coupled in an input current path to receive an inrush current from the input when the input is electrically coupled to the power source, a switch coupled in parallel with the resistor to selectively bypass the resistor, and a transistor coupled to control the switch in response to a voltage across the resistor. The transistor is coupled to open the switch when the voltage across the resistor is above a specified inrush threshold to permit current flow through the resistor, and to close the switch when the voltage across the resistor is below the specified inrush threshold to bypass the resistor and allow the switch to conduct current from the input.

According to another aspect of the present disclosure, a DC-DC power converter includes an input for receiving DC power from a power source, an output for supplying DC power to an electronic device, a power circuit coupled between the input and the output to convert a voltage of the DC power received at the input to a different voltage of the DC power supplied at the output, and a control circuit coupled to control switching operation of the power circuit. The DC-DC power converter also includes a resistor coupled in an input current path to receive an inrush current from the input when the input is electrically coupled to the power source, a switch coupled in parallel with the resistor to selectively bypass the resistor, and an isolator coupled to selectively enable one or more other circuits electrically coupled to the isolator in response to a voltage across the resistor, the isolator coupled to enable the other circuit(s) when the voltage across the resistor is above a specified inrush threshold and to disable the other circuit(s) when the voltage across the resistor is below the specified inrush threshold.

According to a further aspect of the present disclosure, an inrush current limiter circuit includes an input for receiving an inrush current, a resistor coupled in an input current path to receive the inrush current from the input when the input is electrically coupled to a power source, a switch coupled in parallel with the resistor to selectively bypass the resistor, and a transistor coupled to control the switch in response to a voltage across the resistor. The transistor is coupled to open the switch when the voltage across the resistor is above a specified inrush threshold to permit current flow through the resistor, and to close the switch when the voltage across the resistor is below the specified inrush threshold to bypass the resistor and allow the switch to conduct current from the input.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Figure 1:
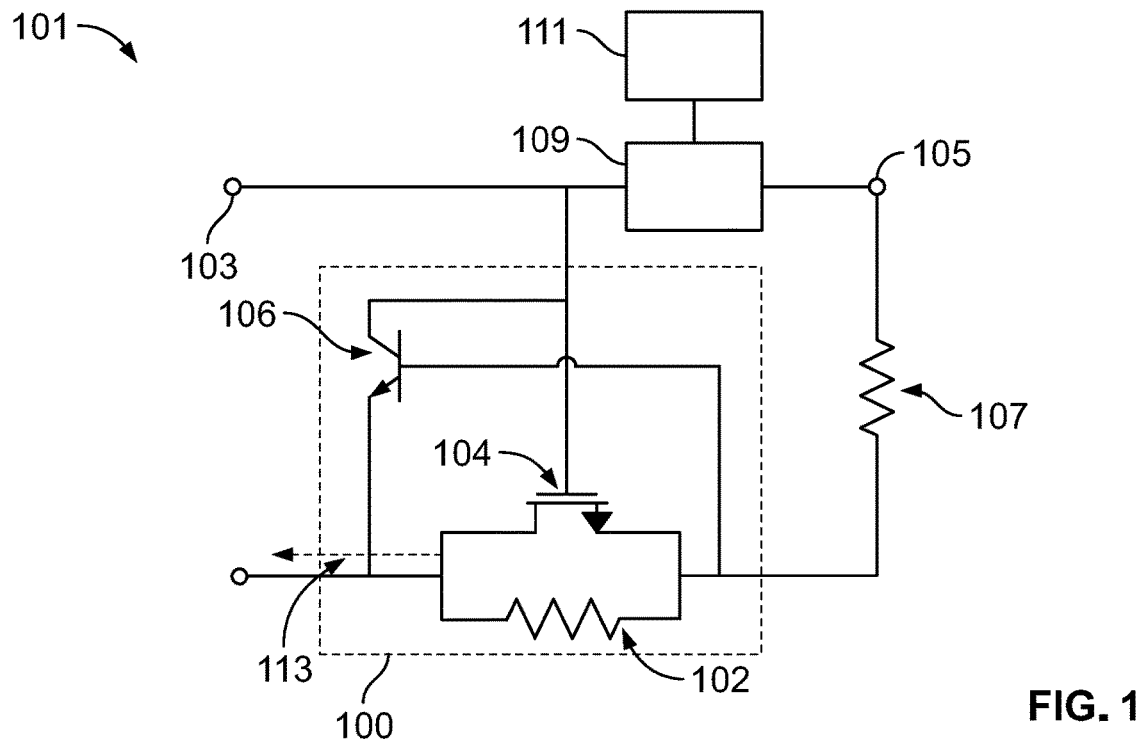
FIG. 1 is a block diagram of a DC-DC power converter including an inrush current limiter circuit, according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings. A DC-DC power converter according to one example embodiment of the present disclosure is illustrated in FIG. 1, and indicated generally by reference number 101. As shown in FIG. 1, the DC-DC power converter 100 includes an input 103 for receiving DC power from an input power source, and an output 105 for supplying DC power to an electronic device 107.

The DC-DC power converter 101 includes a power circuit 109 coupled between the input 103 and the output 105 to convert a voltage of the DC power received at the input 103 to a different voltage of the DC power supplied at the output 105, and a control circuit 111 coupled to control switching operation of the power circuit 109.

The DC-DC power converter 101 further includes a resistor 102, a switch 104 and a transistor 106, which together may define an inrush current limiter circuit 100. The resistor 102 is coupled in an input current path 113 to receive an inrush current from the input 103 when the input 103 is electrically coupled to a power source. The switch 104 is coupled in parallel with the resistor 102 to selectively bypass the resistor 102.

The transistor 106 is coupled to control the switch 104 in response to a voltage across the resistor 102. The transistor 106 is coupled to open the switch 104 when the voltage across the resistor 102 is above a specified inrush threshold to permit current flow through the resistor 102, and to close the switch 104 when the voltage across the resistor 102 is below the specified inrush threshold to bypass the resistor 102 and allow the switch 104 to conduct current from the input 103.

The resistor 102 may limit the inrush current through the inrush current limiter circuit 100 when the circuit 100 is electrically connected with a power source (e.g., when the input 103 is plugged into a power source, etc.). For example, the inrush current limiter circuit 100 may limit inrush current into an electrical component housing the circuit 100 (e.g., the DC-DC power converter 101, etc.) when the electrical component is installed into an active power system, etc.

As mentioned above, the transistor 106 is coupled to control the switch 104 in response to a voltage across the resistor 102. When the inrush current limiter circuit 100 is electrically connected with a power source, etc., a voltage across the resistor 102 may turn on the transistor 106. The transistor 106 opens (e.g., turns off) the switch 104 until the voltage across the resistor 102 is reduced below the specified inrush threshold (e.g., the inrush current through the resistor 102 drops below a specified current value).

When the input 103 is initially connected with the power source, etc., opening the switch 104 (e.g., maintaining the switch 104 in an off-state, etc.) permits the resistor 102 to conduct the inrush current. Conducting current through the resistor 102 protects the switch 104 from inrush currents that may exceed a current rating of the switch 104, may damage the switch 104, etc.

The switch 104 may include any suitable switching element, such as a field-effect transistor (FET) having a source, a drain and a gate, etc. The transistor 106 may include any suitable transistor, such as a bipolar-junction transistor (BJT) having a base, an emitter and a collector, etc. The transistor 106 may be an NPN transistor, a PNP transistor, etc.

In some embodiments, the specified inrush threshold may be approximately equal to a base-emitter voltage of the transistor 106. For example, the transistor 106 may maintain the switch 104 in an off-state until a voltage across the resistor 102 drops below the base-emitter voltage of the transistor 106 (e.g., an inrush current through the resistor 102 is less than the base-emitter voltage of the transistor 106 divided by the resistance value of the resistor 102).

Once the voltage across the resistor 102 drops below the specified inrush threshold, the transistor 106 closes the switch 104 and current is primarily shunted through the switch 104 instead of the resistor 102 (e.g., the switch 104 bypasses the resistor 102). Therefore, the resistor 102 and the transistor 106 can provide inrush current protection for the switch 104 until the inrush current drops to a value that is safe for the switch 104 to conduct.

The input 103 and the output 105 may include any suitable terminal, connector, wire, lead, etc. for transmitting power. The electronic device 107 may include any suitable electronic device, including electronic communication (e.g., telecommunications) equipment. The electronic device 107 may include device(s) that actually perform communication functions, other devices that support and/or facilitate communication, etc., such as radios, antennas, transmitters, switched-mode power supplies, batteries, rectifiers, etc.

The DC-DC power converter 101 may comprise any suitable DC-DC converter topology such as a switching power supply (e.g., a switched-mode power supply (SMPS)). For example, the power circuit 109 may include one or more switches, one or more diodes, one or more capacitors, a transformer, etc. The control circuit 111 may include any suitable combination of hardware (e.g., a processor, logic gates, control circuitry, etc.) and/or software (e.g., computer-executable instructions stored in memory, etc.), arranged to control operation (e.g., switching operation, etc.) of the DC-DC power converter 101.

The DC-DC power converter 101 may be configured to convert a DC input voltage within any suitable specified voltage input range, to a DC output voltage within any suitable voltage output range. For example, the DC-DC power converter 101 may be part of a power distribution system, where the DC-DC power converter 101 is located in a housing, a power panel, etc. to supply power from one or more rectifiers, batteries, etc. to electronic device(s) (e.g., electronic telecommunications equipment, etc.).

Figure 2:
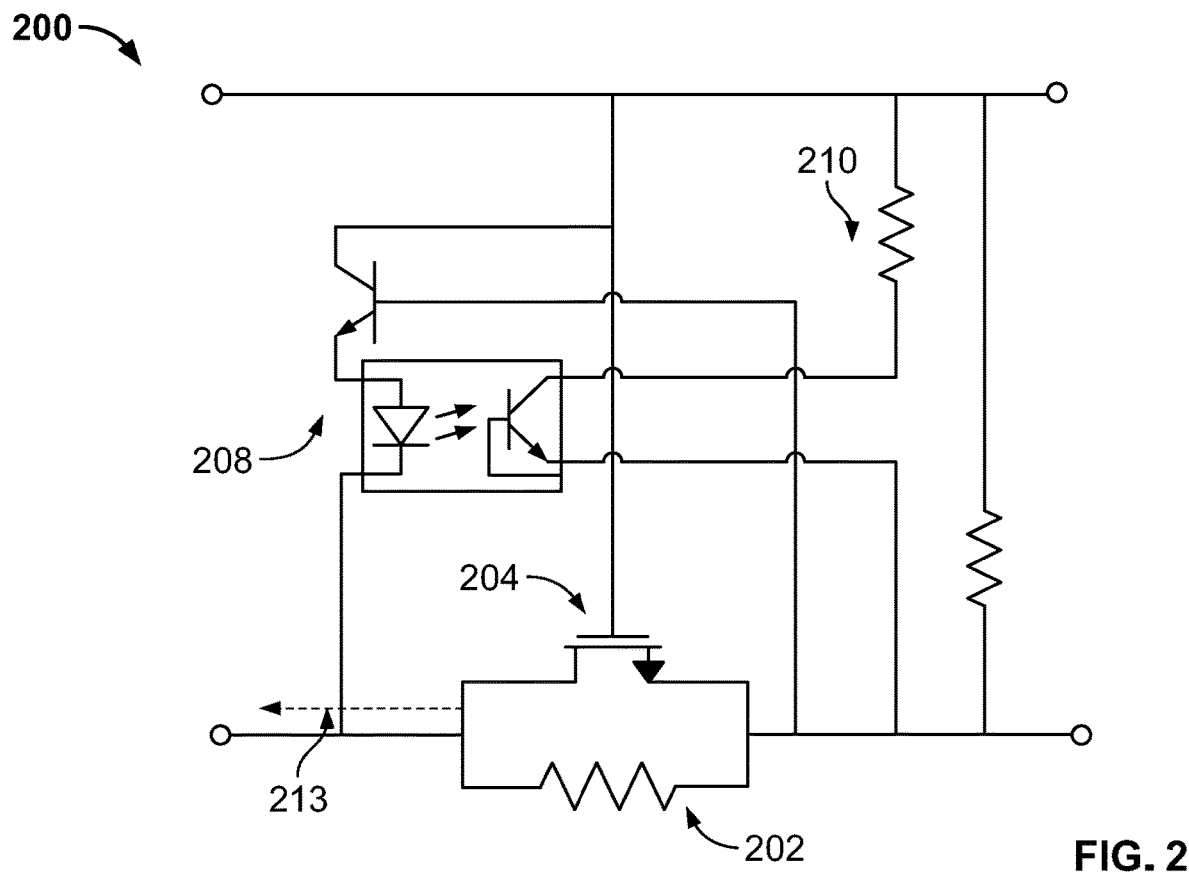
FIG. 2 is a block diagram of an inrush current limiter circuit including an isolator, according to another example embodiment of the present disclosure.

An inrush current limiter circuit according to another example embodiment of the present disclosure is illustrated in FIG. 2, and indicated generally by reference number 200. As shown in FIG. 2, the inrush current limiter circuit 200 includes a resistor 202 coupled in an input current path 213 to receive an inrush current, and a switch 204 coupled in parallel with the resistor 202.

The inrush current limiter circuit 200 also includes an isolator 208 coupled to selectively enable one or more other circuits 210 electrically coupled to the isolator 208 (e.g., to selectively electrically connect the inrush current limiter circuit 200 to a load circuit, etc.), in response to a voltage across the resistor 202. The isolator 208 is coupled to disable the other circuit(s) 210 (e.g., to electrically disconnect the inrush current limiter circuit 200 from the load circuit, etc.) when the voltage across the resistor 202 is above a specified inrush threshold, and to enable the other circuit(s) 210 (e.g., to electrically connect the inrush current limiter circuit 200 to the load circuit, etc.), when the voltage across the resistor 202 reduces below the specified inrush threshold.

The isolator 208 may inhibit one or more circuits 210 from conducting current until an inrush current phase of the inrush current limiter circuit 200 is completed (e.g., until the voltage across the resistor 202 has reduced below the specified inrush threshold, etc.). For example, the isolator 208 may disconnect power to any output circuit(s) 210 of the inrush current limiter circuit 200 during the inrush phase to reduce the power conducted by the resistor 202, to avoid damaging the resistor 202, etc. Example circuits 210 include, but are not limited to, capacitors, power conversion chips, power relays, circuits that draw power from the input, radios, lights, etc.

The isolator 208 may include any device suitable for enabling and disabling other circuit(s) (e.g., loads, etc.) electrically connected with the isolator, such as an optocoupler (e.g., a photo-diode), etc. The isolator 208 may disable one or more circuits 210 when the isolator 208 is turned on by shorting the one or more circuits 210.

Figure 3:
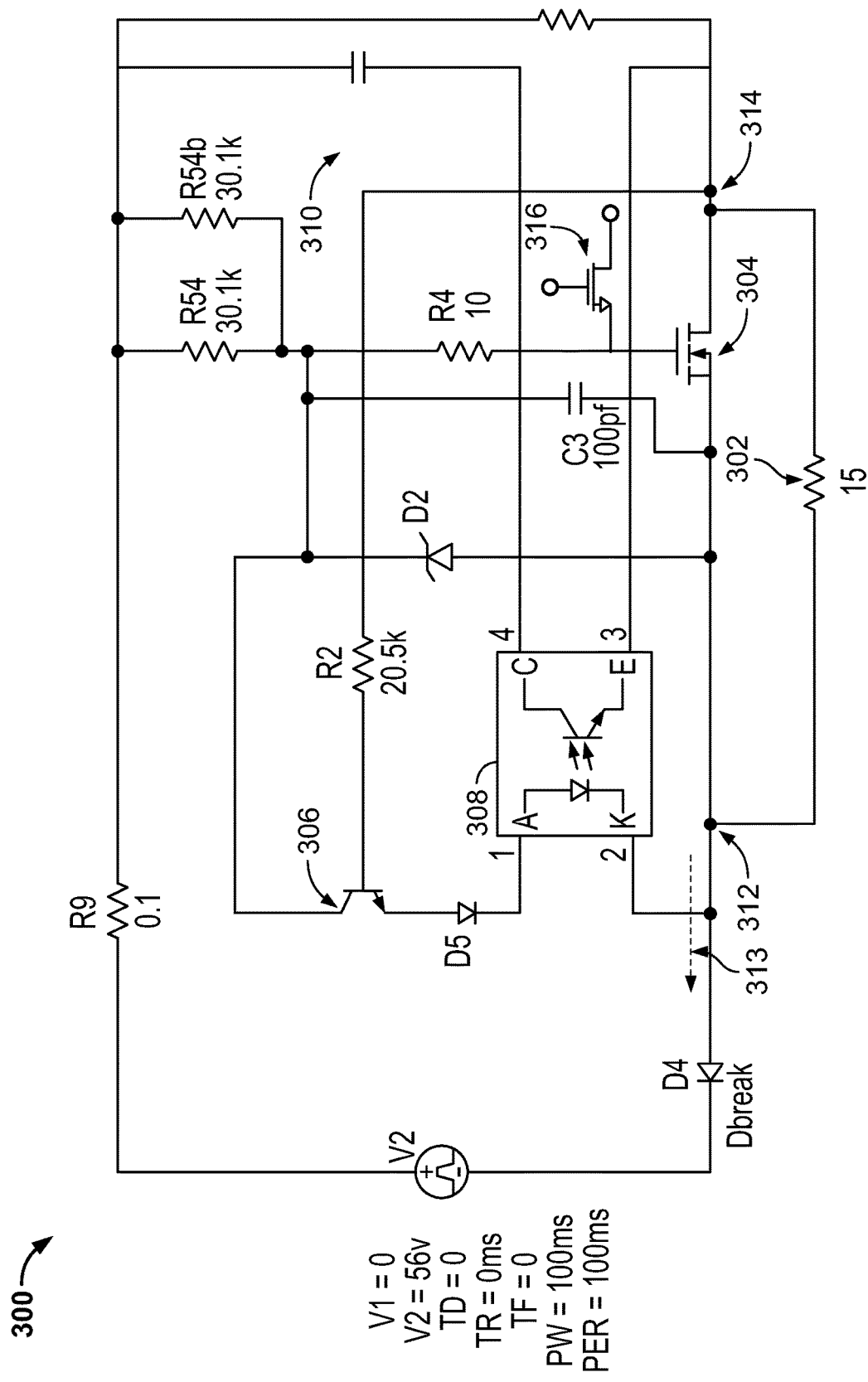
FIG. 3 is a circuit diagram of an inrush current limiter circuit including an isolator and a transistor, according to another example embodiment of the present disclosure.

An inrush current limiter circuit according to another example embodiment of the present disclosure is illustrated in FIG. 3, and indicated generally by reference number 300. As shown in FIG. 3, the inrush current limiter circuit 300 includes a resistor 302 coupled in an input current path 313 to receive an inrush current, and a field-effect transistor (FET) 304 coupled in parallel with the resistor 302.

The inrush current limiter circuit 300 also includes a transistor 306 coupled to control the FET 304 in response to a voltage across the resistor 302. The transistor 306 is coupled to open the FET 304 when the voltage across the resistor 302 is above a specified inrush threshold, and close on the FET 304 when the voltage across the resistor 302 reduces below the specified inrush threshold.

The inrush current limiter circuit 300 also includes an isolator 308 coupled to selectively enable one or more other circuits 310 (e.g., a capacitor circuit, etc.) electrically coupled to the isolator 308, in response to a voltage across the resistor 302. The isolator 208 is coupled to disable the other circuit(s) 310 (e.g., to electrically disconnect the inrush current limiter circuit 300 from the circuit load, etc.) when the voltage across the resistor 302 is above a specified inrush threshold, and to enable the other circuit(s) 310 (e.g., to electrically connect the inrush current limiter circuit 300 to the load circuit, etc.), when the voltage across the resistor 302 reduces below the specified inrush threshold.

As shown in FIG. 3, the isolator 308 is coupled between the transistor 306 and a node 312 defined between the resistor 302 and the FET 304. Specifically, the isolator 308 is coupled between an emitter of the transistor 306 and the node 312, via a diode D5. This allows the isolator 308 to disable the other circuit(s) 310 until the voltage across the resistor 302 drops below the specified inrush threshold. At that point, the transistor 306 will turn on to activate the isolator 308 to enable the other circuit(s) 310.

In other embodiments, the isolator 308 and the transistor 306 may be coupled in the inrush current limiter circuit 300 in other suitable arrangements, including arrangements where the isolator 308 is not coupled between the transistor 306 and the node 312, arrangements where the isolator 308 is not coupled to the emitter of the transistor 306, etc.

As shown in FIG. 3, a base of the transistor 306 is coupled with a node 314 via a resistor R2. The node 314 is defined between ends of the resistor 302 and the FET 304. A collector of the transistor 306 is coupled (via a diode D2) with the node 312 via the diode D2. The node 312 is defined between opposite ends of the resistor 302 and the FET 304. This may allow the transistor 306 to sense, detect, etc. a voltage across the resistor 302 for controlling the FET 304.

A gate of the FET 304 is coupled with the collector of the transistor 306 via a resistor R4. This allows the transistor 306 to selectively turn on and turn off the FET 304 based on a voltage across the resistor 302. For example, the transistor 306 may keep the FET 304 off until a voltage across the resistor 302 drops below the specified inrush threshold.

The specified inrush threshold may be equal to a sum of a base-emitter voltage of the transistor 306 (e.g., about 0.7 Volts), plus a voltage drop across the diode D5 (e.g., about 0.7 Volts), plus a voltage drop across the isolator 308 (e.g., about 1 Volts). In this example, the specified inrush threshold is about 2.4 Volts. When using a fifteen Ohm resistor, a minimum current of about 160 mA through the resistor 302 is needed to keep the FET 304 off. Once the inrush current through the resistor 302 drops below 160 mA, a voltage across the resistor 302 will drop below 2.4 Volts and the transistor 306 will turn off to turn on FET 304.

The inrush current limiter circuit 300 includes an optional mechanical switch 316 coupled to selectively short the FET 304 and a power converter housing the inrush current limiter circuit 300 until the power converter is ready to start. For example, an operator could manually use the optional mechanical switch 316 when plugging in the power converter to inhibit potential issues such as an unclean plug-in creating an arc between pins of the power converter.

FIG. 3 illustrates additional optional circuit components of the inrush current limiter circuit 300 which may or may not be included in other embodiments, depending on a desired design specification of the inrush current limiter circuit 300, etc. For example, FIG. 3 illustrates a voltage input V2, resistors R9, R54 and R54b, a diode D4, and a capacitor C3. Example component values are provided for purposes of illustration only, and other embodiments may include other suitable component values without departing from the scope of the present disclosure.

As shown in FIG. 3, the inrush current limiter circuit 300 does not include a shunt or a control integrated circuit. The inrush current limiter circuit 300 may not require a shunt to monitor the inrush current, or a control IC to monitor the inrush current, because values of the transistor 306 and the resistor 302 may set an inrush current threshold.

In contrast to some approaches that control a gate voltage of an inrush FET to keep the inrush FET in a linear mode during an inrush phase, pulse current through inductors to charge a capacitor, or use specific current sensors, the inrush current limiter circuit 300 may maintain the FET 304 in an off-state during the inrush phase by conducting current through the resistor 302 to provide the inrush limiting function, and turning on the FET 304 when the current through the resistor 302 ramps down to where a voltage across the resistor 302 is less than a specified inrush threshold corresponding to a base-emitter voltage of the transistor 306.

The inrush current limiter circuits 100, 200 and 300 may be used in any suitable power converter (such as the DC-DC power converter 101 illustrated in FIG. 1), or may be used in suitable electronic circuits other than power converters.

Figure 4:
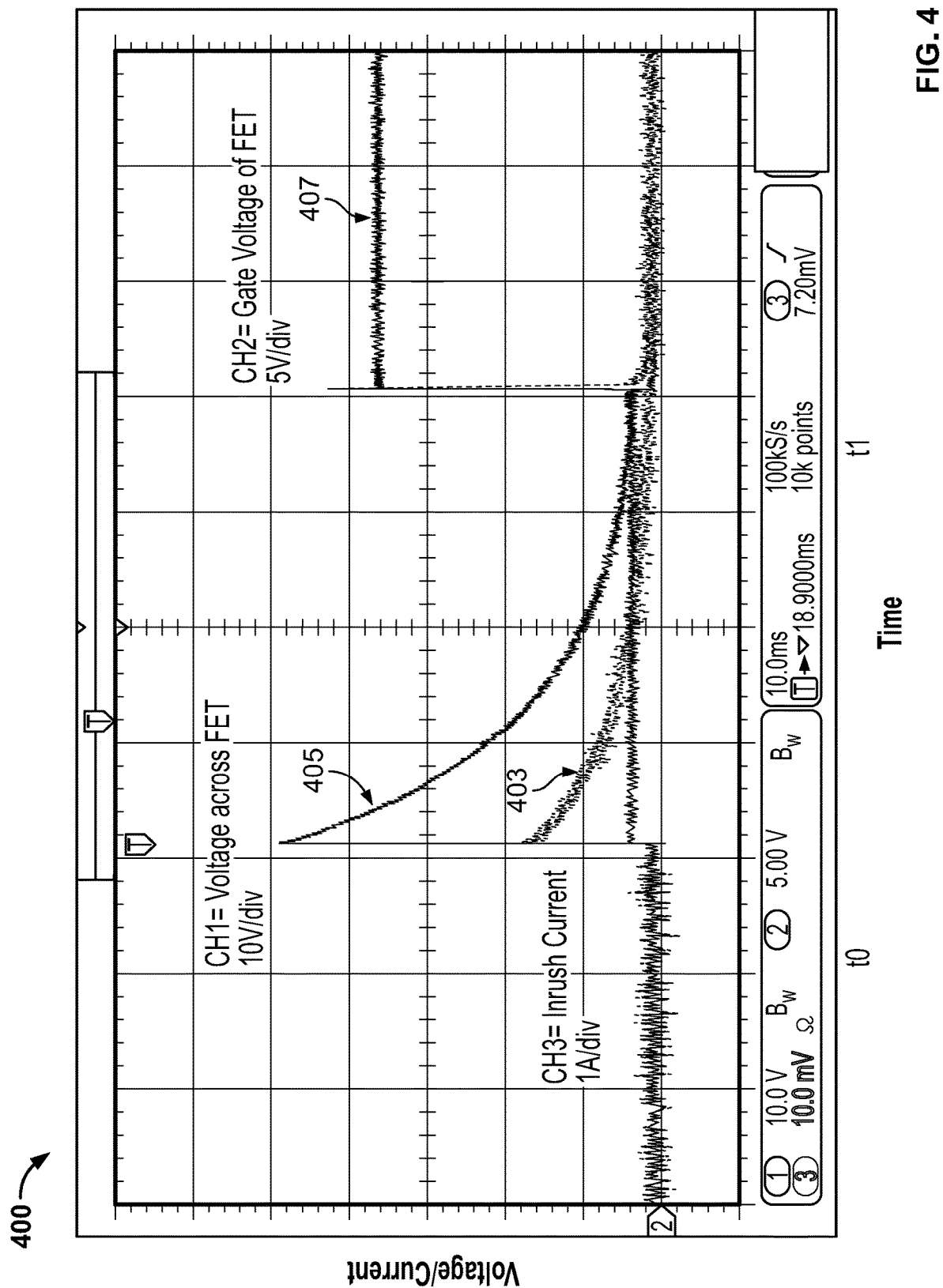
FIG. 4 is a line graph illustrating voltage and current waveforms of the inrush current limiter circuit of FIG. 3.

FIG. 4 is a line graph 400 illustrating example waveforms voltages and currents in the inrush current limiter circuit 300. The graph 400 illustrates a time t0 when the inrush current limiter circuit 300 is first connected with an active power source, etc., and a time t1 when the FET 304 is turned on to conduct current after the inrush current drops below a threshold.

As shown in FIG. 4, a current 403 through the resistor 302 spikes at the time t0 when the inrush current limiter circuit 300 is coupled to an active power source, etc. A voltage 405 across the FET 304 also spikes because the FET 304 is initially in an off-state (e.g., as maintained by the transistor 306). The initial off-state of the FET 304 protects the FET 304 from the inrush current 403, which is instead primarily conducted by the resistor 302.

Between time t0 and time t1, the inrush current 403 through the resistor 302 reduces, and the corresponding voltage 405 across the FET 304 (which is coupled in parallel with the resistor 302) also reduces. At time t1, the inrush current reaches the specified inrush threshold (e.g., a voltage across the resistor 302 reduces below the base-emitter voltage of the transistor 306, etc.), and the FET 304 is turned on (e.g., by the transistor 306).

At time t1, turning on the FET 304 drops the voltage 405 across the FET 304 to about zero (e.g., to about a drain-source voltage of the FET 304, etc.). The resistor 302 also stops conducting most or all of the current 403, because the FET 304 coupled in parallel with the resistor 302 is in an on-state and primarily conducts the current.

FIG. 4 also illustrates a voltage 407 at the gate of the FET 304 (e.g., a voltage across the capacitor C3 and the resistor R4). As shown, the voltage 407 raises slightly at time t0 when the inrush current limiter circuit 300 is initially coupled to active power source, etc. The voltage 407 remains at a logical low value until the time t1, when the voltage 407 rises to a logical high value to turn on the FET 304. For example, the voltage 407 at the gate of the FET 304 may be controlled by the transistor 306 as described herein.

Example switches, transistors, resistors, etc. may be configured to perform (e.g., operable to perform, coupled to perform, etc.) any of the example processes described herein using any suitable connection arrangement of terminals of the device, any suitable electrical properties of the device, etc. For example, switches, transistors, etc. may be configured to turn on and turn off based on voltages applied to terminal(s) of the device with respect to electrical property thresholds of the device, etc., may be configured to control other devices based on circuit connectivity with other devices and/or circuit components, etc.

The example inrush current limiter circuits may be incorporated in any suitable electrical device that may experience inrush currents, such as power converters, etc. Some example power converters may be plugged into a hot bus to power a cellular radio tower, may convert an input voltage of about 48 Volts to an output voltage of about 58 Volts, etc. For example, the input 103 of the DC-DC power converter 101 of FIG. 1 may include one or more terminals that are sized, spaced, etc. to couple with receptacle(s) of a hot bus arranged to provide power to a cellular radio tower. In some cases, the inrush current limiter circuits may be considered as pre-charge circuits.

According to another example embodiment, a method of method of limiting inrush current in a circuit is disclosed. The circuit includes a transistor, and a resistor coupled in parallel with a switch. The method includes opening the switch, by the transistor, in response to receiving an inrush current through the resistor. The method also includes closing the switch, by the transistor, in response to the inrush current through the resistor reducing below a specified inrush threshold.

In some embodiments, the circuit may include an isolator. The method may include enabling one or more other circuits electrically coupled to the isolator (e.g., electrically disconnecting the inrush current limiter circuit from a load, etc.) when the voltage across the resistor is above the specified inrush threshold, and disabling the other circuit(s) (e.g., electrically connecting the inrush current limiter circuit to the load, etc.) when the voltage across the resistor is below the specified inrush threshold.

The specified inrush threshold may correspond to a base-emitter voltage of the transistor. For example, the specified inrush threshold may be a voltage value that includes the base-emitter voltage of the transistor, voltage drop values of diode(s) or isolator(s) coupled with the transistor, etc. The method may include turning on the transistor when the voltage across the resistor is above the specified inrush threshold.

According to yet another example embodiment, another method of limiting inrush current in a circuit is disclosed. The circuit includes an isolator, and a resistor coupled in parallel with a switch. The method includes disabling, by the isolator, one or more other circuits electrically coupled to the isolator (e.g., electrically disconnecting a load from the circuit), in response to receiving an inrush current through the resistor. The method also includes enabling, by the isolator, the other circuit(s) electrically coupled to the isolator (e.g., electrically connecting the load, etc.) in response to the inrush current through the resistor reducing below a specified inrush threshold.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A DC-DC power converter comprising:
an input for receiving DC power from a power source;
an output for supplying DC power to an electronic device;
a power circuit coupled between the input and the output to convert a voltage of the DC power received at the input to a different voltage of the DC power supplied at the output;
a control circuit coupled to control switching operation of the power circuit;
a resistor coupled in an input current path to receive an inrush current from the input when the input is electrically coupled to the power source;
a switch coupled in parallel with the resistor to selectively bypass the resistor;
a transistor coupled to control the switch in response to a voltage across the resistor, the transistor coupled to open the switch when the voltage across the resistor is above a specified inrush threshold to permit current flow through the resistor, and to close the switch when the voltage across the resistor is below the specified inrush threshold to bypass the resistor and allow the switch to conduct current from the input; and
an isolator coupled between the transistor and a node defined between the resistor and the switch to selectively enable one or more other circuits electrically coupled to the isolator in response to the voltage across the resistor.

2. The DC-DC power converter of claim 1, wherein the isolator is coupled to enable the other circuit(s) when the voltage across the resistor is above the specified inrush threshold, and to disable the other circuit(s) when the voltage across the resistor is below the specified inrush threshold.

3. The DC-DC power converter of claim 1, wherein the isolator comprises an optocoupler.

4. The DC-DC power converter of claim 1, wherein the isolator is coupled between the emitter of the transistor and the node defined between the resistor and the switch.

5. The DC-DC power converter of claim 1, wherein the switch comprises a field-effect transistor (FET).

6. The DC-DC power converter of claim 1, wherein the specified inrush threshold corresponds to a base-emitter voltage of the transistor.

7. The DC-DC power converter of claim 1, wherein the transistor is coupled to turn on when the voltage across the resistor is above the specified inrush threshold.

8. The DC-DC power converter of claim 1, wherein the node comprises a first node defined between a first end of the resistor and a first end of the switch, a base of the transistor is coupled with the first node, and a collector of the transistor is coupled with a second node defined between a second end of the resistor and second end of the switch.

9. The DC-DC power converter of claim 1, wherein a gate of the switch is coupled with a collector of the transistor.

10. The DC-DC power converter of claim 1, wherein the inrush current limiter circuit does not include a shunt or a control integrated circuit.

11. The DC-DC power converter of claim 1, further comprising a mechanical switch coupled to the transistor to allow an operator to manually short the transistor when electrically connecting the input to the power source.

12. The DC-DC power converter of claim 1, wherein the power converter is adapted for plugging into a hot bus to supply power to a cellular radio tower.

13. The DC-DC power converter of claim 1, wherein the transistor comprises an NPN transistor.

14. The DC-DC power converter of claim 1, wherein the other circuit(s) include at least one of a power conversion chip, a power relay, a circuit coupled to draw power from the input, a radio, and a light.

15. A DC-DC power converter comprising:
an input for receiving DC power from a power source;
an output for supplying DC power to an electronic device;
a power circuit coupled between the input and the output to convert a voltage of the DC power received at the input to a different voltage of the DC power supplied at the output;
a control circuit coupled to control switching operation of the power circuit;
a resistor coupled in an input current path to receive an inrush current from the input when the input is electrically coupled to the power source;
a switch coupled in parallel with the resistor to selectively bypass the resistor; and
an isolator coupled to selectively enable one or more other circuits electrically coupled to the isolator in response to a voltage across the resistor, the isolator coupled to enable the other circuit(s) when the voltage across the resistor is above a specified inrush threshold and to disable the other circuit(s) when the voltage across the resistor is below the specified inrush threshold.

16. The DC-DC power converter of claim 15, wherein the isolator comprises an optocoupler.

17. The DC-DC power converter of claim 15, further comprising a transistor coupled to control activation of the switch, wherein the isolator is coupled between an emitter of the transistor and a node defined between the resistor and the switch.

18. The DC-DC power converter of claim 17, wherein the specified inrush threshold corresponds to a base-emitter voltage of the transistor.

19. An inrush current limiter circuit comprising:
an input for receiving an inrush current;
a resistor coupled in an input current path to receive the inrush current from the input when the input is electrically coupled to a power source;
a switch coupled in parallel with the resistor to selectively bypass the resistor;
a transistor coupled to control the switch in response to a voltage across the resistor, the transistor coupled to open the switch when the voltage across the resistor is above a specified inrush threshold to permit current flow through the resistor, and to close the switch when the voltage across the resistor is below the specified inrush threshold to bypass the resistor and allow the switch to conduct current from the input; and
a mechanical switch coupled to the transistor to allow an operator to manually short the transistor when electrically connecting the input to the power source.

20. The inrush current limiter circuit of claim 19, further comprising an isolator coupled to selectively enable one or more other circuits electrically coupled to the isolator, in response to the voltage across the resistor.

* * * * *